United States Patent
Jeuk et al.

(10) Patent No.: US 10,382,596 B2
(45) Date of Patent: Aug. 13, 2019

(54) TRANSMITTING NETWORK OVERLAY INFORMATION IN A SERVICE FUNCTION CHAIN

(71) Applicant: Cisco Technology, Inc., San Jose, CA (US)

(72) Inventors: Sebastian Jeuk, San Jose, CA (US); Gonzalo Salgueiro, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 64 days.

(21) Appl. No.: 15/190,641

(22) Filed: Jun. 23, 2016

(65) Prior Publication Data
US 2017/0373990 A1    Dec. 28, 2017

(51) Int. Cl.
  H04L 29/06   (2006.01)
  H04L 12/725  (2013.01)
  H04L 12/721  (2013.01)
  H04L 12/715  (2013.01)

(52) U.S. Cl.
  CPC ............ H04L 69/22 (2013.01); H04L 45/306 (2013.01); H04L 45/38 (2013.01); H04L 45/64 (2013.01)

(58) Field of Classification Search
  CPC ...................... H04L 69/22; H04L 49/3009
  See application file for complete search history.

(56) References Cited

U.S. PATENT DOCUMENTS

| | | | |
|---|---|---|---|
| 9,729,406 B2 | 8/2017 | Jeuk et al. | |
| 9,979,645 B2 | 5/2018 | Li et al. | |
| 2013/0103834 A1 | 4/2013 | Dzerve et al. | |
| 2014/0169215 A1 | 6/2014 | Rajendran et al. | |
| 2014/0307744 A1 | 10/2014 | Dunbar et al. | |
| 2014/0334295 A1 | 11/2014 | Guichard et al. | |
| 2014/0334488 A1 | 11/2014 | Guichard et al. | |
| 2014/0362682 A1 | 12/2014 | Guichard et al. | |
| 2015/0063102 A1 | 3/2015 | Mestery et al. | |
| 2015/0089082 A1 | 3/2015 | Patwardhan et al. | |
| 2015/0131484 A1 | 5/2015 | Aldrin | |
| 2015/0195197 A1* | 7/2015 | Yong ....................... | H04L 45/74 370/392 |
| 2015/0326473 A1* | 11/2015 | Dunbar ............... | H04L 12/4633 370/392 |
| 2016/0050141 A1 | 2/2016 | Wu et al. | |
| 2016/0065456 A1 | 3/2016 | Muley et al. | |

(Continued)

FOREIGN PATENT DOCUMENTS

| | | | |
|---|---|---|---|
| WO | 2016/045710 A1 | 3/2016 | |
| WO | WO 2017095815 A1 * | 6/2017 | ............. H04L 45/74 |

OTHER PUBLICATIONS

Baker et al., Aug. 12, 2015, Network Working Group Internet-Draft, pp. 1-28.*

(Continued)

*Primary Examiner* — Lakeram Jangbahadur
(74) *Attorney, Agent, or Firm* — Edell, Shapiro & Finnan, LLC

(57) ABSTRACT

A packet is received at a device configured to provide a service function within a network service chain. A network overlay and/or segmentation identifier is extracted from a header of the packet. The service function is applied to the packet according to policies specific to a network overlay and/or segmentation identified in the network overlay and/or segmentation identifier.

20 Claims, 7 Drawing Sheets

(56) References Cited

U.S. PATENT DOCUMENTS

| | | |
|---|---|---|
| 2016/0119226 A1 | 4/2016 | Guichard et al. |
| 2016/0134481 A1 | 5/2016 | Akiya et al. |
| 2016/0164776 A1* | 6/2016 | Biancaniello ......... H04L 45/306 370/392 |
| 2016/0173373 A1 | 6/2016 | Guichard et al. |
| 2016/0323183 A1 | 11/2016 | Jeuk et al. |
| 2017/0005920 A1* | 1/2017 | Previdi ................. H04L 45/306 |
| 2017/0012865 A1 | 1/2017 | Nainar et al. |
| 2017/0054639 A1 | 2/2017 | Zhou et al. |
| 2017/0078176 A1 | 3/2017 | Lakshmikantha et al. |
| 2017/0093658 A1* | 3/2017 | Ryan ...................... H04L 43/067 |
| 2017/0163531 A1* | 6/2017 | Kumar .................... H04L 45/74 |
| 2017/0230467 A1 | 8/2017 | Salgueiro et al. |
| 2018/0026893 A1 | 1/2018 | Jeuk et al. |

OTHER PUBLICATIONS

Jeuk, Towards Cloud-Aware Policy Enforcement with Universal Cloud Classification as a Service, 2016 IEEE, p. 489-496.*
Baker et al., "A Model for IPv6 Operation in OpenStack", Internet Draft, Cisco Systems, Feb. 8, 2015, 38 pages.
Jeuk et al., "Universal Cloud Classification (UCC) and its Evaluation in a Data Center Environment", 2014 IEEE 6th International Conference on Cloud Computing Technology and Science, Dec. 15-18, 2014, 6 pages.
Jeuk et al., "Towards Cloud, Service and Tenant Classification for Cloud Computing", 2014 14th IEEE/ACM International Symposium on Cluster, Cloud and Grid Computing, May 26-29, 2014, 10 pages.
Deering et al., "Internet Protocol, Version 6 (IPv6)", Cisco, Dec. 1998, 39 pages.
S. Jeuk, et al., "Tenant-ID: Tagging Tenant Assets in Cloud Environments", 2013 13th IEEE/ACM International Symposium on Cluster, Cloud, and Grid Computing, May 13-16, 2013, Delft, Netherlands, 6 pages.
S. Jeuk, et al., "A Novel Approach to Classify Cloud Entities: Universal Cloud Classification (UCC)", 2015 15th IEEE/ACM International Symposium on Cluster, Cloud and Grid Computing, May 4-7, 2015, Shenzhen, China, 4 pages.
S. Jeuk, et al., "Network Segmentation in the Cloud a Novel Architecture Based on UCC and IID", 2015 IEEE 4th International Conference on Cloud Networking (CloudNet), Oct. 5-7, 2015, Niagara Falls, on, Canada, 6 pages.
S. Jeuk, et al., "Towards Cloud-Aware Policy Enforcement with Universal Cloud Classification as a Service (UCCaaS) in Software Defined Networks", 2016 IEEE 9th International Conference on Cloud Computing, Jun. 27-Jul. 2, 2016, San Franciso, CA, 8 pages.

* cited by examiner

TRANSMITTING NETWORK OVERLAY INFORMATION IN A SERVICE FUNCTION CHAIN

TECHNICAL FIELD

The present disclosure relates to network service chains.

BACKGROUND

Network service chains are sequences of actions or service functions that are applied to packets of traffic as the packets pass through physical and/or virtual network elements. The service functions may be arranged according to pre-defined policies and then deployed using automated processes. A network service header is added to the packets of a data stream and describes a sequence of service nodes that the packet must be routed to prior to reaching the destination address. The network service header may also include metadata information about the packet and/or the service chain.

Network overlays are technologies that may run on top of an Open Systems Interconnection (OSI) model Layer 2 (L2) or Layer 3 (L3) environment. Overlay technologies may include Virtual Extensible Local Area Networks (VxLANs), Generic Routing Encapsulation (GRE) or Virtual Private Network (VPN) Tunnels. Segmentation technologies may be used to isolate and distinguish traffic flows on different layers of the OSI model. Segmentation may include using overlay technologies (e.g., VLAN, VxLAN, GRE, etc.) on L2 and L3, while other segmentation technologies may be used on other OSI model layers. For example, port addresses may be used to provide segmentation on OSI model Layers 4-7. Network overlays and/or segmentation allow networks to be subdivided or segmented into virtual networks such that the physical network elements may be used to implement one or more independent and secure virtual networks. Network overlays and/or segmentation may be implemented by partitioning network devices per physical port, through marking or tagging of packets, and/or encapsulating packets in overlay or segmentation specific headers. When overlay or segmentation specific headers are utilized, packet payloads may be encrypted on a per-overlay/segmentation basis to ensure the security of the different overlays/segmentations sharing the same physical devices.

DESCRIPTION OF EXAMPLE EMBODIMENTS

Overview

In one embodiment, a packet is received at a device configured to provide a service function within a network service chain. A network overlay or segmentation identifier is extracted from a header of the packet. The service function is applied to the packet according to policies specific to a network overlay or segmentation identified in the network overlay or segmentation identifier.

In another embodiment, a packet is received at a device configured to provide a service function within a network service chain. Network overlay or segmentation information is extracted from a header of the packet. The packet is configured according to a network overlay or segmentation protocol identified by the network overlay or segmentation information. According to some embodiments, the configuring of the packet according to the network overlay or segmentation protocol identified by the network overlay or segmentation information may include translating between different overlay or segmentation technologies via the service function.

Example Embodiments

Figure 1:
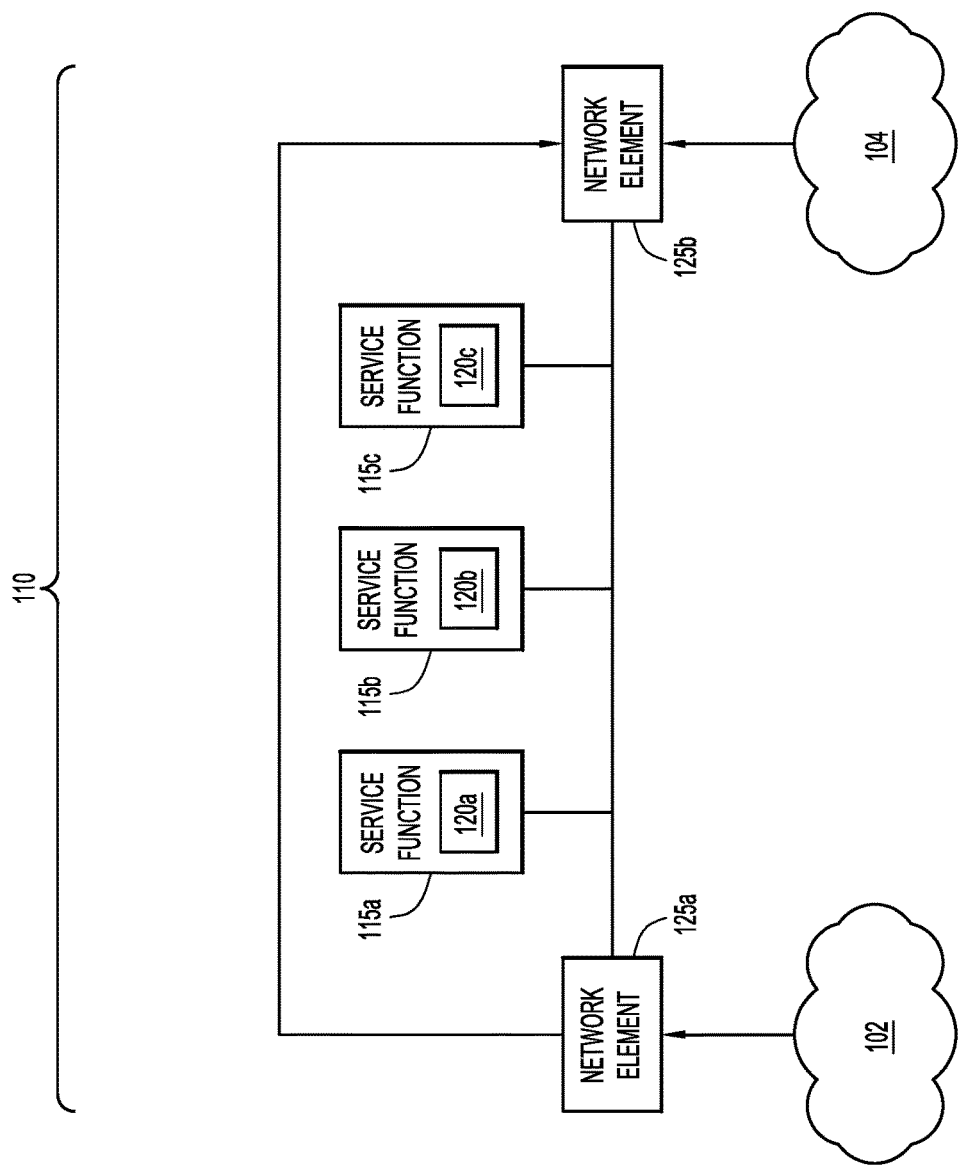
FIG. 1 is an illustration of a network service chain configured with network overlay and/or segmentation awareness, according to an example embodiment.

With reference made to FIG. 1, depicted therein is a network environment 100 configured to receive network overlay and/or segmentation information in Network Service Headers (NSHs). Based upon this received information, network environment 100 is configured to provide network overlay and/or segmentation specific network services within a network service chain. Included within network environment 100 is network service chain 110. Service functions 115a-c within network service chain 110 provide network service functions to packets traversing network service chain 110. Network service functions 115a-c include services such as deep-packet inspection (DPI), firewall services, network address translation (NAT), and hypertext transfer protocol (HTTP) application functions, among other functions. As will be described herein, the services applied by service functions 115a-c may also include providing services in response to a network overlay and/or segmentation identifier contained in the packets traversing network service chain 110. By providing services in response to a network overlay and/or segmentation identifier, the service functions 115a-c may apply service functions specifically tailored to the identified overlay and/or segmentation.

Also provide for herein are service functions which configure a packet according to a network overlay and/or segmentation based upon information extracted from the packet at a network service function. Accordingly, one or more of service functions 115a-c may be configured to operate on a packet such that the packet is modified to conform with a network overlay and/or segmentation technology. The configuration of the packet performed by the one or more of service functions 115a-c may include converting or translating the packet from a packet configured according to a first network overlay and/or segmentation technology to a packet configured for a second network overlay and/or segmentation technology.

The path through which the traffic traverses network service chain 110 may be determined by an NSH applied to and encapsulating the traffic traversing network environment 100. Based on the content of the NSH, a packet may traverse network service chain 110, having network services applied by network service functions 115a-c. In conventional service chains, service functions 115a-c may be unaware of the network overlay and/or segmentation associated with a particular packet traversing service chain 110, as this information may not have been included in the NSH for the packets, it may only be included in the payload of the NSH encapsulation, or it may have been completely stripped from the packet during the encapsulation in the NSH. Accordingly, network services functions 115a-c would be unable to apply network services based upon the network overlay and/or segmentation associated with any particular packet.

In the example embodiment of FIG. 1, network service functions 115a-c include network overlay/segmentation identifier agents/units 120a-c, respectively. Each of network overlay/segmentation identifier units 120a-c performs a function to extract network overlay/segmentation information, such as a network overlay and/or segmentation identifier, from packets traversing network service chain 110, and causes the service function to be applied to the packet based, at least partially, on an identity derived from the network overlay/segmentation identifier. The network overlay/segmentation identifier agents/units 120a-c may be embodied as software running in conjunction with the network service functions 115a-c, respectively. As used herein, a "network overlay identifier" may identify a network overlay protocol and/or a specific network overlay implementation (i.e., a specific instance of a network overlay protocol environment). Similarly, a "segmentation identifier" may identify a segmentation protocol, and/or a specific segmentation implementation (i.e., a specific implementation of a segmentation protocol environment).

In order for the network overlay/segmentation identifier to be extracted by network overlay/segmentation identifier agents/units 120a-c, network elements 125a and 125b may insert the network overlay/segmentation identifier into the NSH of the packet when transmitting the packet into network service chain 110. For example, network element 125a (which may be embodied as a classifier element for network service chain 110) receives or generates a packet to be transmitted into network service chain 100. Specifically, the packet may have been received from data center and/or network 102 in which a network overlay and/or segmentation technology has been implemented. For example, network 102 may be a data center in which Virtual Private Network (VPN), Virtual Local Area Network (VLAN), Virtual Extensible Local Area Network (VxLAN), Generic Routing Encapsulation (GRE), Network Virtualization using Generic Routing Encapsulation (NVGRE), Distributed Overlay Virtual Ethernet (DOVE), Multiprotocol Label Switching (MPLS), Generalized MPLS (GMPLS) or another type of overlay or segmentation has been implemented. Accordingly, the packet received at classifier network element 125a may have overlay or segmentation encapsulation, or other information identifying the network overlay and/or segmentation implementation from which it was received. In order for the packet to traverse network service chain 110, network element 125a may provide the packet with an NSH defining the path and services to be applied to the packet. As part of this process, classifier network element 125a may determine a network overlay/segmentation identifier for the packet based upon the network overlay or segmentation applied in network 102, and include this network overlay/segmentation identifier in the NSH for the packet. In other words, the network overlay/segmentation identifier may be based on a source network overlay and/or source network segmentation.

According to other examples, classifier network element 125a may be aware that the packet is destined for network 104. Network 104 implements a network overlay and/or segmentation technology that may be the same or different from that of network 102. Network 104 may also be the same network as network 102. Classifier network element 125a may determine a network overlay/segmentation identifier for the packet based upon the network overlay and/or segmentation applied in network 104, and include this network overlay/segmentation identifier in the NSH for the packet. In other words, the network overlay/segmentation identifier may be based upon a destination network overlay and/or a destination network segmentation.

According to still other examples, classifier network element 125a may be aware of both the source and destination network overlay and/or segmentation technologies implemented by networks 102 and 104, respectively. Accordingly, classifier network element 125a may insert a network overlay/segmentation identifier into an NSH that is combination of the network overlay or segmentation technologies implemented by networks 102 and 104, respectively. Classifier network element 125a may also insert a plurality of network overlay/segmentation identifiers into the NSH, one for the network overlay or segmentation technology implemented by network 102, and one for the network overlay or segmentation technology implemented by network 104.

The NSH in which the packet may be encapsulated includes data describing a service function path that the packet may travel within the network 100 in order to receive the appropriate service functions. The NSH also includes metadata fields that may be accessed by the service functions when applying their services. Classifier network element 125a may insert one or more network overlay/segmentation identifiers into one or more metadata fields of the NSH. The metadata may comprise a series of fixed length metadata headers (e.g., a Type 1 Network Service Header) or one or more variable length metadata headers (e.g., a Type 2 Network Service Header). The NSH may be encrypted to add a layer of protection and ensure that the information is securely transported such that it cannot be altered or bypassed.

Figure 2A:
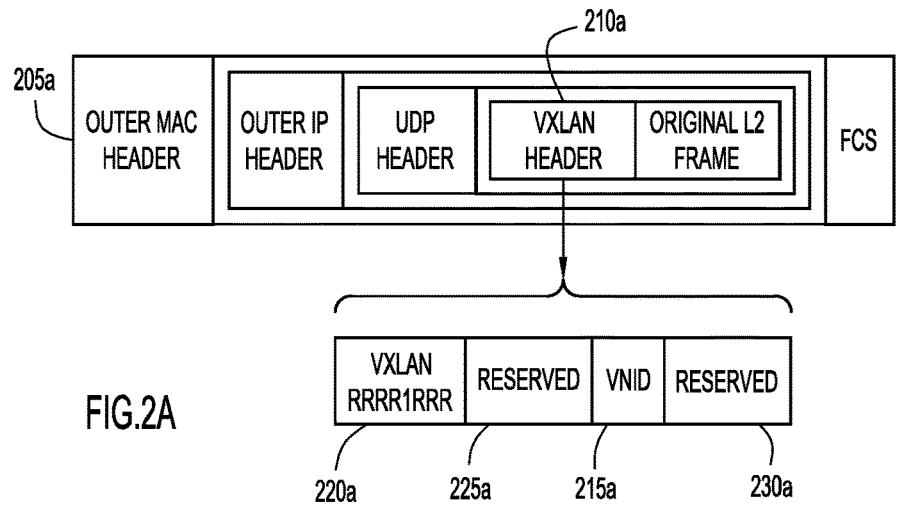
FIGS. 2A-2C illustrate examples of network overlay and/or segmentation identifiers, specifically a Virtual Extensible Local Area Network identifier, a Virtual Local Area Network identifier, and a Universal Cloud Classification, according to example embodiments.
Figure 2B:
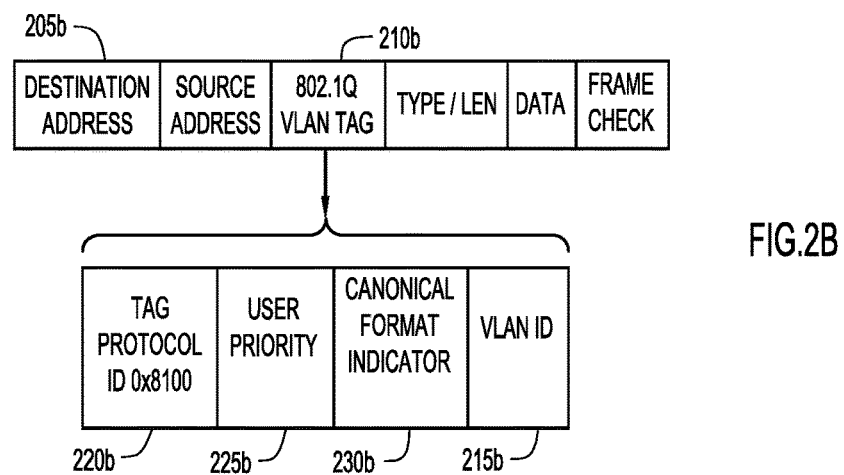
Figure 2C:
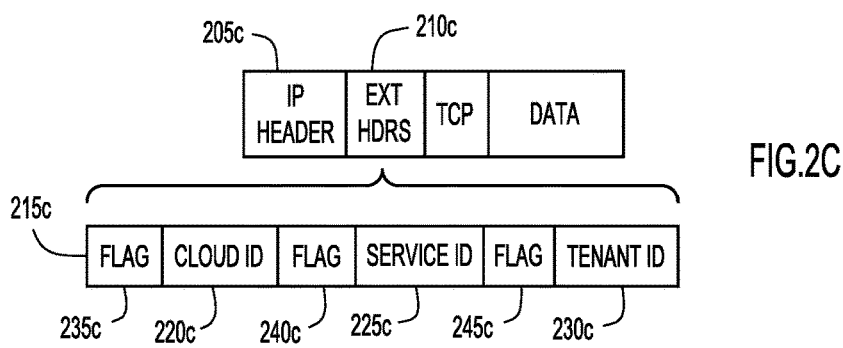

The network overlay/segmentation identifier may be extracted from the packet by the classifier network element 125a from the data contained in the packet being encapsulated in the NSH. For example, the packet received by classifier network element 125a may include one or more fields that serve as a network overlay/segmentation identifier, as illustrated in FIGS. 2A-2C below. According to the example of FIG. 1, a packet containing network overlay and/or segmentation encapsulation is received at classifier network element 125a. Classifier network element 125a extracts a network overlay/segmentation identifier from the network overlay or segmentation encapsulation of the packet. Once extracted from the network overlay or segmentation encapsulation, the network overlay/segmentation identifier may be included in the NSH in, for example, a metadata field of the NSH. Specific examples of metadata fields that include network overlay/segmentation identifiers are described below with reference to FIGS. 4 and 5. Accordingly to other example, embodiments, a source or destination address may be extracted from the packet. Classifier network element 125*a* may be aware of the network overlay or segmentation technology associated with one more of these addresses, and therefore, is able to insert a network overlay/segmentation identifier into the NSH based upon one or more of the source or destination address.

By including the network overlay/segmentation identifier in a metadata field of the NSH, service functions 115*a-c* may leverage these identifiers without being configured to evaluate a new or separate network overlay/segmentation identifier field. Specifically, each of the service functions 115*a-c* is configured to be able to evaluate the content of the NSH metadata fields. By including the network overlay identifiers in the NSH metadata fields, service functions may utilize the network overlay/segmentation identifier when determining how to apply services to the packet, and therefore, may apply services to the packet based on the network overlay associated with the packet (i.e., the network overlay from which the packet was received and/or the network overlay that the packet may enter once it leaves service chain 110).

Furthermore, by including the network overlay/segmentation identifier in the NSH, the need for network service functions, like network service functions 115*a-c*, to understand network overlay or segmentation encapsulation may be eliminated. For example, to enable VxLAN in a data center (e.g., data center/network 102) certain control plane requirements have to be met, including support for multicast. Often, service functions of network service chains (i.e., service functions 115*a-c*) are not or should not be aware of these technologies/requirements. Accordingly, a VxLAN tunnel may be terminated prior sending traffic to service functions. In the example of FIG. 1, a VxLAN tunnel may be terminated at the interface between data center/network 102 and classifier network device 125*a*. By including a VxLAN identifier (i.e., a network overlay identifier) in the NSH as the packet traverses network service chain 110, the VxLAN tunnel may be continued and rebuilt as soon as the traffic leaves the network service chain. Specifically, based upon the VxLAN identifier, a service function may be configured to configure the packet for the VxLAN upon its exit from the service chain. In other words, network device 125*b* may reconstruct the VxLAN specific elements of the packet as the packet exits network service chain 110.

The techniques described herein also allow for the correlation of relevant information with network overlay/segmentation identifiers, thereby allowing network service functions 115*a-c* to apply fine-grained policy application. Through the inclusion of network overlay/segmentation identifiers in the NSH, the network overlay/segmentation identifier may be correlated to other useful and relevant information, such as routing, Network Address Translation or security details.

With reference to FIGS. 2A-2C, illustrated therein are example network overlay and/or segmentation identifiers that may be included in an NSH of a network service chain. Specifically, illustrated in FIG. 2A is an example packet 205*a*. Included within packet 205*a* is VxLAN header 210*a*. As illustrated in FIG. 2A, VxLAN header 210*a* includes a 24-bit VxLAN identifier (VNID) 215*a* and a number of additional reserved fields 220*a*, 225*a* and 230*a*. As a 24-bit number, VNID 215*a* may be an integer up to 16,777,215. Accordingly, a network overlay identifier associated with a VxLAN may be an integer value between 0 and 16,777,215. A classifier, such as classifier 125*a* of FIG. 1 may extract this value from a received packet and include it in an NSH, as is described in greater detail below with reference to FIGS. 4 and 5.

Depicted in FIG. 2B is a packet 205*b* configured for a VLAN, and includes a VLAN tag 210*b*. Included in VLAN tag 210*b* is a 12-bit VLAN identifier 215*b*, a tag protocol identifier 220*b*, a user priority value 225*b* and a canonical format indicator field 230*b*. As a 12-bit number, VLAN identifier 215*b* may be an integer value between 0 and 4,096. A classifier, such as classifier 125*a* of FIG. 1 may extract this value from a received packet and include it in an NSH, as is described in greater detail below with reference to FIGS. 4 and 5. The classifier may also extract protocol identifier 220*b* and include it in the NSH as part of the network overlay/segmentation identifier.

Finally, depicted in FIG. 2C is an Internet Protocol version 6 (IPv6) packet 205*c* that includes an extension header 210. Included in extension header 210*c* is a Universal Cloud Classification (UCC) 215*c* that is comprised of a cloud identifier 220*c*, a service identifier 225*c*, a tenant identifier 230*c*, and one or more flags 235*c*, 240*c* and 245*c*. A UCC does not explicitly identify a segmentation and/or overlay technology or implementation. Instead, a UCC is a hierarchical identifier that identifies a cloud, a service and a tenant associated with a particular packet. As will be discussed below, this information may be used by a service function to determine a network overlay or segmentation technology or implementation associated with the packet.

Structurally, the UCC is loosely based on a "Digital Object Identifier" (DOI) scheme that creates hierarchical sub-identifiers within each ID. The scheme includes 3 main UCC IDs including (i) cloud identifier 220*c* to identify a cloud provider, (ii) service identifier 225*c* to identify a service within a cloud provider, and (iii) a tenant identifier 230*c* with cloud provider significance, meaning a tenant identifier registered with a given cloud provider. Cloud identifier 220*c* may be embodied as a 24-bit value, service identifier 225*c* may be embodied as a 6-byte value and tenant identifier 230*c* may be embodied as a 16-bit value. A classifier, such as classifier 125*a* of FIG. 1, and or a service function, such as service functions 115*a-c*, may be able to identify a network overlay and/or segmentation technology associated with a cloud, service or tenant identified by one or more of cloud identifier 220*c*, service identifier 225*c*, and/or tenant identifier 230*c*. Accordingly, a classifier may extract one or more of cloud identifier 220*c*, service identifier 225*c*, and/or tenant identifier 230*c* from a packet and include it an NSH, as is described in greater detail below with reference to FIGS. 4 and 5. According to other embodiments, the classifier may extract one or more of cloud identifier 220*c*, service identifier 225*c*, and/or tenant identifier 230*c*, use the value to determine a network overlay or segmentation technology associated with the one or more of cloud identifier 220*c*, service identifier 225*c*, and/or tenant identifier 230*c*, and include an identifier explicitly identifying the network overlay and/or segmentation technology in an NSH.

Figure 3:
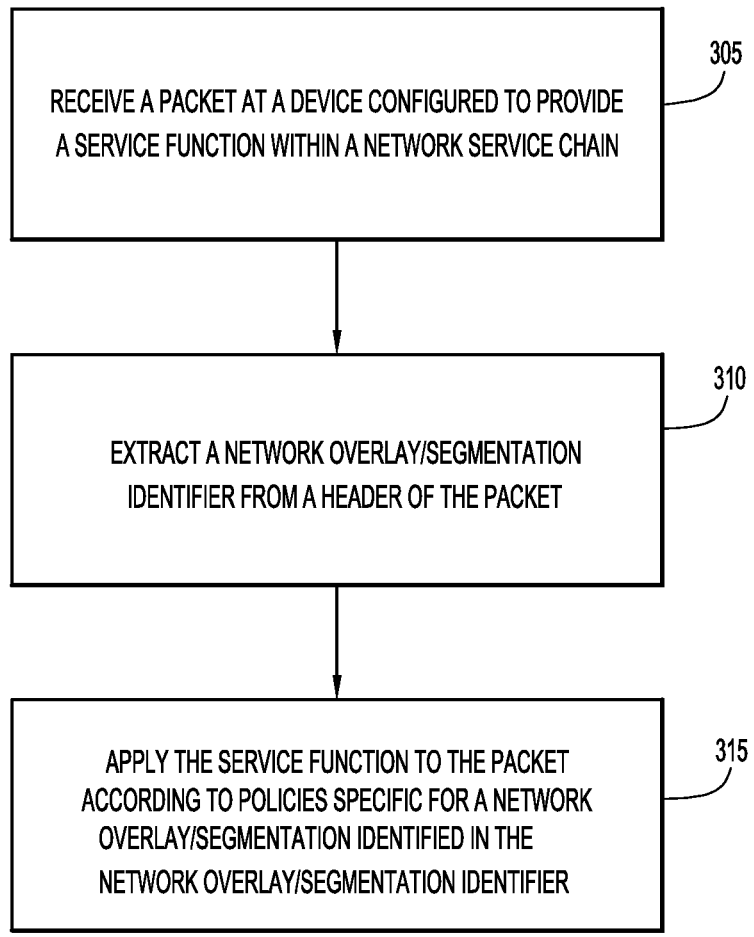
FIG. 3 is a flowchart illustrating a process for providing network overlay and/or segmentation awareness in network service chains, according to an example embodiment.

With reference now made to FIG. 3, depicted therein is a flowchart 300 illustrating a process for providing overlay or segmentation-specific network services within a network service chain. The process begins in operation 305 where a packet is received at a service function within a service chain. The service function is configured to provide network overlay specific network services within a network service chain. The packet may include a network overlay identifier, as described above with reference to FIGS. 1 and 2, and/or has a structure as described below with reference to FIGS. 4 and 5.

In operation 310, a network overlay/segmentation identifier is extracted from a header of the packet. The network overlay/segmentation identifier may identify one or more network overlays or segmentations for a source or destination network. Operation 310 may also extract additional information from the header of the packet and/or the payload of the packet.

In operation 315, the service function is applied to the packet according to policies specific for a network overlay and/or segmentation identified in the network overlay/segmentation identifier. The network service may also be applied based on a combination of the network overlay/segmentation identifier and other information that may be included in the header of the packet, such as in a metadata field of the packet. These values and the services applied based on them may include:

Network Overlay/Segmentation Identifiers+IMEI Number—The International Mobile Station Equipment Identity (IMEI) Number is used to uniquely identify Global System for Mobile (GSM), Universal Mobile Telecommunications System (UMTS) and Long-Term Evolution (LTE) mobile phones. A mobile service provider may utilize different network overlays for different customers. To define IMEI and overlay-specific or segmentation-specific (i.e., customer-specific) policies within the network service chain, metadata identifying both the network overlay and/or segmentation implementation and the IMEI number may be needed. Including the network overlay/segmentation identifier and the IMEI number (or numbers) in the metadata field of the NSH enables network service provisioning on a per-service/per-tenant and per-IMEI number basis.

Network Overlay/Segmentation Identifiers+Session Identifier—Session Initiation Protocol (SIP) and/or ITU Telecommunication Standardization Sector (ITU-T) recommendation H.323 are protocols used to establish voice and/or video sessions between two endpoints. These protocols use identifiers to uniquely identify multimedia sessions, end-to-end. These identifiers may be carried in the NSH. A provider of voice/video applications may have different customers utilizing customer-specific overlays or segmentations. Including the network overlay/segmentation identifier with session identifiers allows for the application of policies per SIP/H.323 stream owned by a certain customer per network function in the network service chain.

Network Overlay/Segmentation Identifiers+Geographic Location—Geographic location or "geolocation" is used to pinpoint the exact geographical location of an IP connected object such as a mobile phone. Geolocation information is useful in networks that apply policies based on geography. For example, certain traffic flows originating in Germany require the application of network services that reflect German laws. Other flows are more specific and local to the United States or the United Kingdom. Correlating the geolocation details to network overlay/segmentation identifiers allows location-specific policies to be applied within the network service chain on a per-service basis.

Network Overlay/Segmentation Identifiers+SLA—Service Level Agreement (SLA) details are a critical component of service offerings in overlay or segmentation environments. Overlay or segmentation providers are keen to have the means to fulfill the offered SLAs on all levels of a network overlay environment, including within service chains associated with the network overlay and/or segmentation environments. With the insertion and correlation of network overlay and/or segmentation and SLA information into the NSH, service functions may define policies according to SLAs on a network overlay or segmentation basis.

Network Overlay/Segmentation Identifiers+NAT—Network Address Translation (NAT) is an Open Systems Interconnection Mode Layer 3 network function that translates internal IP addresses to globally routable addresses. Applying NAT rules on a network overlay or segmentation basis is a key advantage for overlay and/or segmentation providers and may be enabled by incorporating NAT details per overlay or per segmentation.

Network Overlay/Segmentation Identifiers+Routing—Incorporating forwarding information and the correlated overlay or segmentation identifiers in the NSH enables service functions to forward traffic based on overlay or segmentation requirements.

Network Overlay/Segmentation Identifiers+Interface Identifier—The Interface Identifier (IID) is part of the IPv6 stack and is defined in Internet Engineering Task Force (IETF) Request for Comments (RFC) 4291. The IID is used to uniquely identify interfaces on a link, and the IID is typically incorporated into an IPv6 unicast address. Correlating the IID with network overlay/segmentation identifiers allow network services in a network function chain to apply policies per-service/per-overlay/per-segmentation flow coming from a particular virtual machine (VM). This approach to defining network policies allows for the segmenting of VM traffic based upon the network overlay or segmentation and based upon the IIC.

Network Overlay/Segmentation Identifiers+Storage Information—Correlating the network overlay or segmentation with storage information such as World Wide Names (WWNs) or World Wide Port Names (WWPNs) allows for the creation of network function chains with overlay or segmentation specific storage policies.

Network Overlay/Segmentation Identifiers+VPN—Virtual Private Networks (VPNs) typically require certain details to setup tunnel endpoints. Conveying VPN details in correlation with other network overlay or segmentation identifiers allows network functions to setup VPN tunnels with service/tenant specific needs/characteristics.

Network Overlay/Segmentation Identifiers+Security Details—Correlating security (such as keys, encryption strength, etc.) and network overlay and/or segmentation details allows network security functions to be specific to a network overlay or segmentation implementation.

Network Overlay/Segmentation Identifiers+Quality of Service (QoS) Requirements—The NSH may be used to identify interesting flows and signal flow characteristics as a means of consistent treatment of traffic and maintaining user experience across domains. Correlating these flows with network overlay identifiers provides overlay or segmentation providers with the ability to offer differentiated treatment on a network overlay or segmentation basis.

Network Overlay/Segmentation Identifiers+Cloud Identifiers—By combining network overlay identifiers with cloud identifiers, such as a Universal Cloud Classification (UCC), network services may be applied with cloud and overlay/segmentation granularity.

The service function applied to the packet according to policies specific for a network overlay and/or segmentation technology or implementation identified in the network overlay identifier may also include configuring the packet to conform with a network overlay and/or segmentation technology, or translating or converting the packet between network overlay or segmentation technologies. Such example embodiments are described in greater detail below with reference to FIG. 6.

Figure 4:
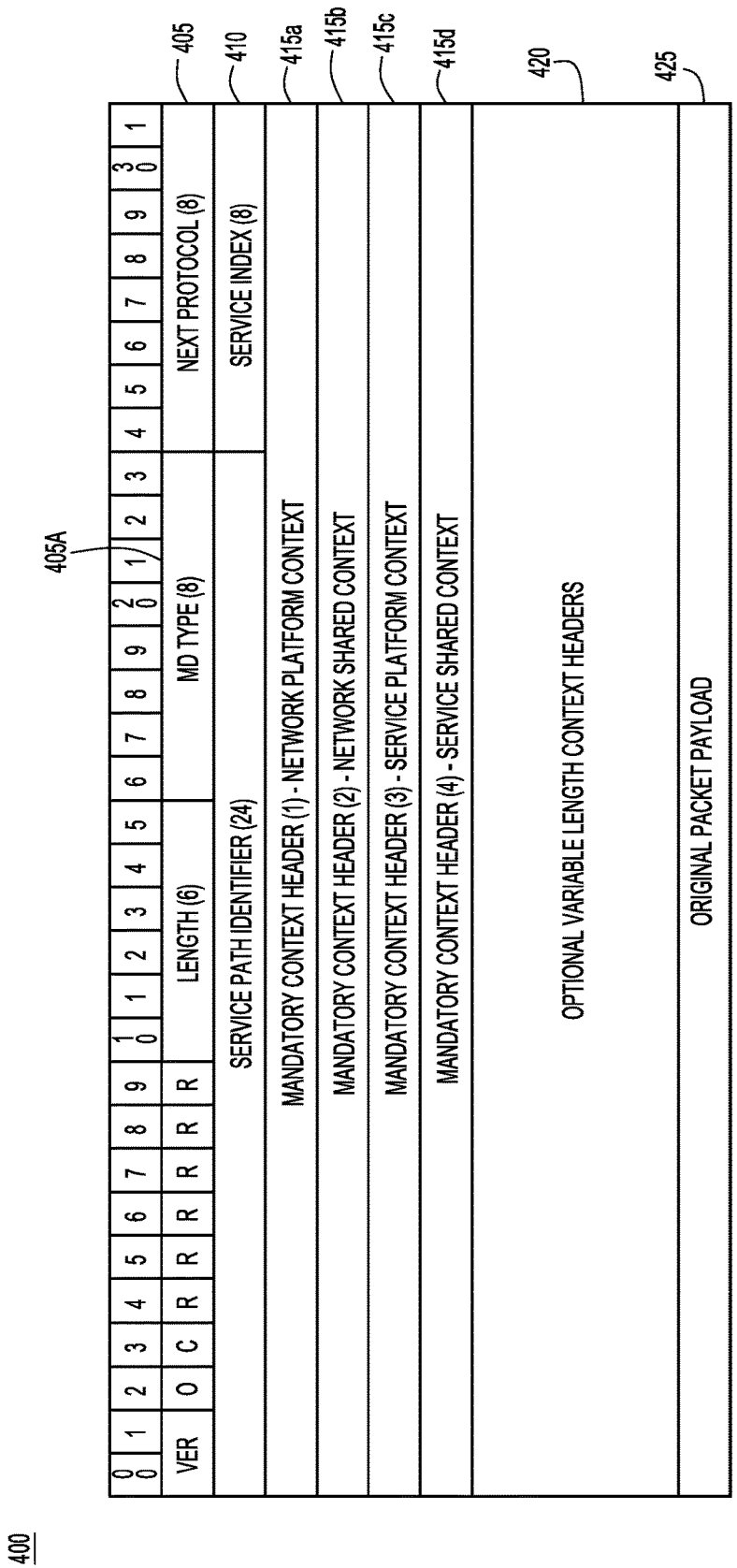
FIG. 4 illustrates a first example header providing network overlay and/or segmentation awareness in network service chains, according to an example embodiment.
Figure 5:
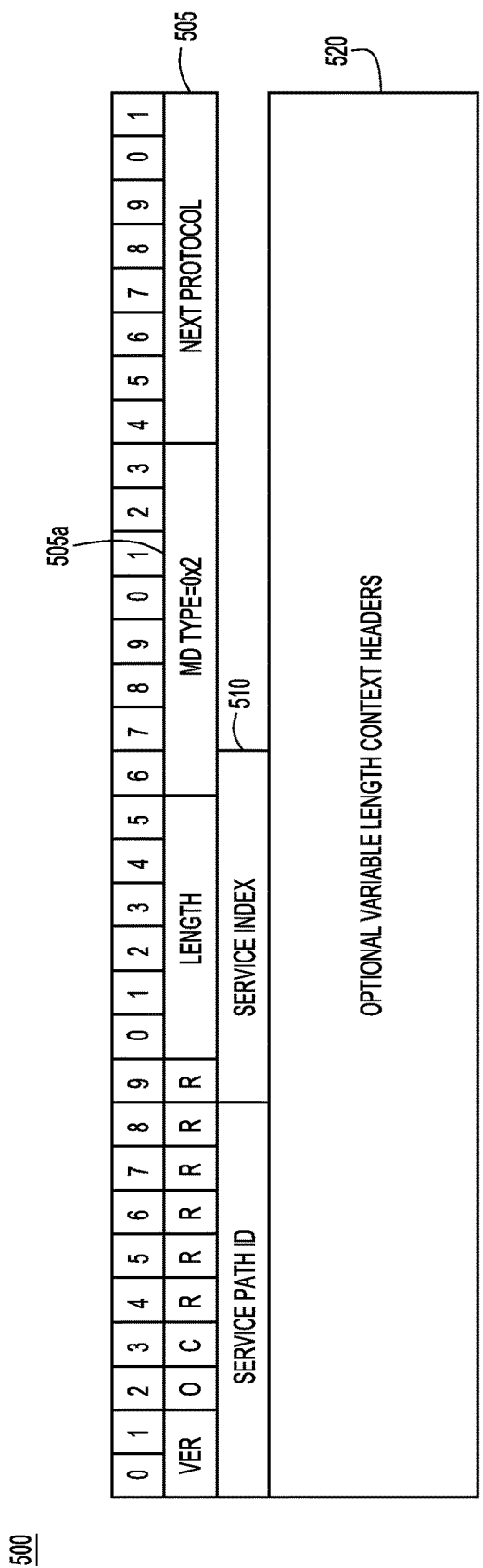
FIG. 5 illustrates a second example header providing network overlay and/or segmentation awareness in network service chains, according to an example embodiment.

With reference now made to FIG. 4, depicted therein is a first example NSH 400 that is configured to include network overlay/segmentation identifier information. NSH 400 includes a 4-byte base header 405 and a 4-byte service path header 410. The base header 405 provides information about the service header 400 and the payload 420. Included in base header 405 is a metadata type field 405a that indicates the metadata type, among a plurality of types. The metadata type field 405a in the example of FIG. 4 is what is known as Type 1 metadata. This means that the NSH includes four mandatory 4-byte context headers 415a-d. NSH 400 also includes optional variable length context headers 420. Mandatory context headers 415a-d carry opaque metadata. The optional variable length context headers carry variable length type-length-value (TLV) formatted information. The service path header 410 provides path identification and location within a path information. Finally, NSH 400 encapsulates the original packet 425.

According to the techniques described herein, the network overlay/segmentation identifier may be included in any one of the fixed context headers 415a-d and/or of the variable length context headers 420, depending on how the network overlay/segmentation identifier may be used. For example, context header 415a provides network platform context metadata, i.e., platform specific metadata shared between network nodes. Context header 415b provides network shared context, i.e., metadata relevant to any network node. Context header 415c provides service platform context, i.e., service platform specific metadata shared between service functions. Context header 415d provides service shared context, i.e., metadata relevant to and shared between service functions. Optional variable length context header 420 includes TLV formatted metadata. Depending on how the network overlay/segmentation identifier is used, it may be contained in any one of these metadata fields.

By leveraging the metadata fields of NSH 400 to include a network overlay/segmentation identifier in the NSH, network service chains may provide overlay or segmentation-specific services even when the network elements and/or VMs are not configured to otherwise be aware of the network overlay or segmentation associated with a network packet. Specifically, every network service function of a network service chain is configured to access the metadata portions of NSH 400. By including the network overlay/segmentation identifier in the metadata fields, network service functions may be applied according to overlay and/or segmentation specific policies.

With reference now made to FIG. 500, depicted therein is another example NSH 500. NSH 500 also includes a base header 505 and a service path header 510. Where metadata type field 405a of FIG. 4 indicates that NSH 400 has Type 1 metadata, metadata type field 505a of FIG. 5 indicates that NSH 500 includes Type 2 metadata. Accordingly, NSH 500 does not include fixed context headers, such as fixed context headers 415a-d of FIG. 4. Instead, NSH 500 only contains variable length context headers 520. Optional variable length context headers 520 include TLV formatted metadata. According to one example, a network overlay/segmentation identifier may be included in variable length context headers 520.

Figure 6:
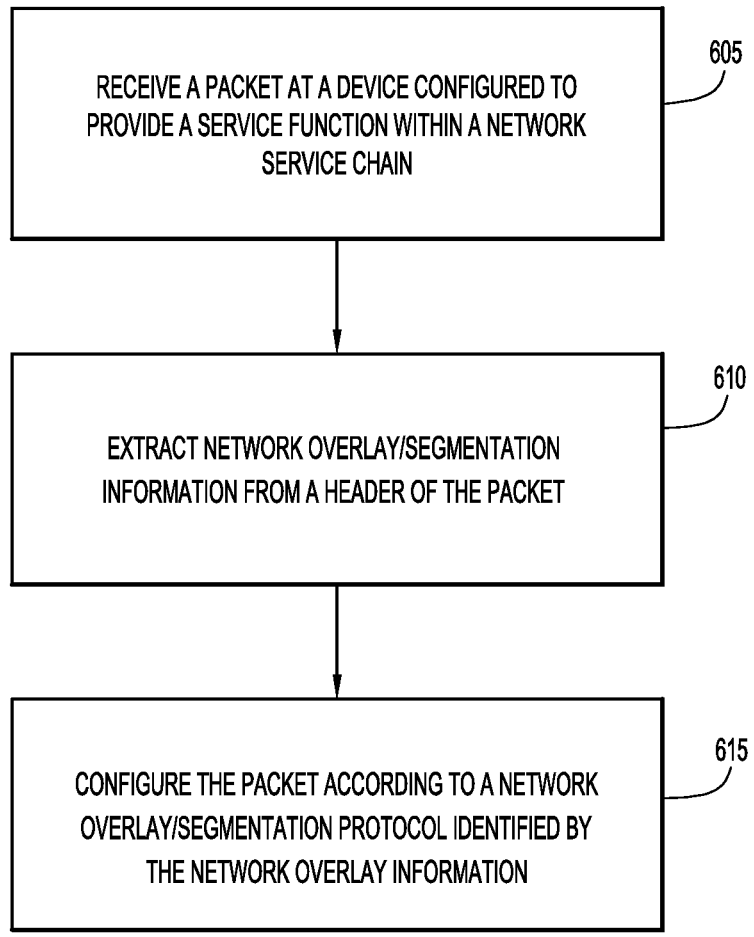
FIG. 6 is a flowchart illustrating a process for configuring a packet to conform with a network overlay and/or network segmentation at a service function of a network service chain, according to an example embodiment.

With reference now made to FIG. 6, depicted therein is a flowchart 600 illustrating a process for configuring, encapsulating and/or converting a packet to conform with a network overlay or segmentation protocol and/or implementation at a network service function of a network service chain. The process starts in operation 605 where a packet is received at a service function within a network service chain. In operation 610, network overlay and/or segmentation information is extracted from a header of the packet. According to some example embodiments, the header may be the NSH of the packet. In such an example embodiment, the network overlay and/or segmentation information may be embodied as one or more network overlay/segmentation identifiers, as described above with reference to FIGS. 1-5.

The network overlay and/or segmentation information extracted in operation 610 may uniquely identify a network overlay and/or segmentation technology or implementation. For example, the network overlay and/or segmentation information may be a VxLAN identifier, such as VxLAN identifier 215a of FIG. 2A, or a VLAN identifier, such as VLAN identifier 215b of FIG. 2B. The network overlay and/or segmentation information extracted in operation 610 may also be embodied as an identifier that allows a network service function to determine a network overlay and/or segmentation technology or implementation. For example, the network overlay and/or segmentation information may be all or a portion of a UCC, such as UCC 215c of FIG. 2C, that the service function may correlate with additional data stored locally with or remotely from the service function in order to determine a network overlay and/or segmentation associated with the UCC.

According to other example embodiments, the service function associated with the device may be configured to provide inspection of the data encapsulated by the NSH header, for example, network overlay and/or segmentation information from a header encapsulated in the NSH. According to still other example embodiments, the network overlay and/or segmentation information may be embodied as source or destination address information in either the NSH or a header of the packet encapsulated in the payload portion of the service chain packet. The service function may be configured to determine a network overlay or segmentation protocol and/or implementation associated with the address information.

In operation 615, the service function configures the packet to conform with a network overlay or segmentation protocol or implementation identified from the network overlay and/or segmentation information extracted in operation 610. For example, the configuration performed in operation 615 may configure the packet to conform with one or more or the packets described in FIGS. 2A-C. If an IPv6 packet is received and the network overlay and/or segmentation information extracted in operation 610 indicates that the packet should be configured as a VxLAN packet, the configuration performed in operation 615 may include the service function inserting VxLAN header 210a of FIG. 2A, as well as any additional necessary header portions into the received packet. On the other hand, if the network overlay and/or segmentation information extracted in operation 610 indicates that the packet should be configured as a VLAN packet, the configuration performed in operation 615 may include the service function inserting VLAN header 210b of FIG. 2B into the packet.

The configurations performed in operation 615 may include operations more complicated than adding or altering a header. For example, VPN technologies require encryption. Therefore, the configuration performed in operation 615 may include all steps necessary to encrypt the packet for use in a VPN implementation. Accordingly, the configuration performed in operation 615 may include Internet Protocol Security (IPSec) exchanges necessary to encrypt the packet.

According to some example embodiments, the device performing the service function may be configured to remove the NSH from the packet, and re-encapsulate the packet with a network overlay or segmentation header. Such an operation may take place at the last service function or device within a service chain, such as device 125b of FIG. 1. Once the NSH is removed, and the new header applied, the packet may be sent out of the network service chain and into a network configured with the network overlay and/or segmentation protocol or implementation for which the packet has now been configured.

According to other example embodiments, the service function may be configured to alter the payload of the network service chain packet, i.e., alter the content of the data encapsulated by the NSH. For example, the service function may leave the NSH in place, and modify the data encapsulated by the NSH of the network service chain packet such that when a subsequent service function or service chain element removes the NSH, the now un-encapsulated packet is configured to comply with the network overlay or segmentation protocol or implementation identified from the network overlay and/or segmentation information extracted in operation 610.

The altering of the service chain packet payload may include adding a network overlay or segmentation header to the payload and/or altering a pre-existing overlay or segmentation header contained in the payload of the service chain packet. For example, a packet may be received at the network service chain from a first network configured according to a first network overlay. This packet is encapsulated in an NSH sent into a network service chain. When the packet is received at a network device that applies a service function configured to carry out the operations of flowchart 600, the network overlay and/or segmentation header of the packet may be altered (i.e., translated, modified) to conform with the network overlay or segmentation implemented in a network into which the packet may be sent after it has traversed the network service chain.

The altering of the packet encapsulated by the NSH may involve stripping the header that conforms with the network overlay implemented in the first network and applying a new header that implements the network overlay of the second network. The service function may also decrypt the payload of the packet according to encryption provided in the network overlay/segmentation of the first network and/or re-encrypt the payload according to the encryption implemented in the network overlay/segmentation in the second network. Still other example embodiments may simply add a new header to the contents of the payload of the service chain packet when the first network does not implement a network overlay or when a device, such as a service chain classifier, strips the network overlay or segmentation header from a packet before encapsulating a packet in an NSH.

One specific example embodiment of the configuration performed by operation 615 may include network overlay and/or segmentation identifier translation that converts a VLAN packet into a packet configured for a VxLAN. In other words, a service function may translate or convert a packet configured for one network overlay and/segmentation into a packet configured for another network overlay and/or segmentation. The translation may be implemented in response to policies that provide interoperability and that manage differences between the network overlay and/or segmentation technologies that the service function is translating between. Such differences may include differences in the size of a network overlay/segmentation identifier and/or a difference in scope (i.e., differences in which OSI model layer upon which the network overlay and/or segmentation is implemented). In other words, the translation may translate the packet from conforming to the packet structure of FIG. 2B to conform with the packet structure of FIG. 2A.

For example, a VLAN identifier extracted from the metadata field of a NSH at the entry point to a Service Function Chain may be translated to a VxLAN identifier at the exit point of the Service Function Chain. This translation may be achieved by leveraging a more granular identifier, such as the UCC described above with reference to FIG. 2C that allows correlating between VLANs and VxLANs while maintaining traffic separation. Specifically, a single VLAN may be defined for a plurality of service/tenant pairings, while VxLANs may be provided with service/tenant granularity. The UCC may provide sufficient information for the service function to determine a VxLAN associated with this service/tenant pairing. The service function may access locally or remotely stored data that correlates the service/tenant pairing identified in the UCC with a particular VxLAN. Based on this determined pairing, the service function may translate the VLAN identifier received with the packet to the appropriate VxLAN identifier for the same service tenant pair. The service function may also add additional headers and header values that are contained in a VxLAN configured packet, but not in a VLAN configured packet.

Through the example translation described above, traffic that shares the same VLAN may be separated and isolated in a specific VxLAN via a service function of a service chain. The reverse process may also be performed in example service chains; packets received belonging to different VxLANs may be aggregated into a single VLAN through a service function of a service chain. This splitting and aggregating may be based on service identifiers and/or tenant identifiers, such as those contained in a UCC. The above-described fan-out (i.e., from one VLAN to multiple VxLANs) and aggregation (from multiple VxLANs to one VLAN) operates at layer 2 of the OSI model because VLAN and VxLAN are layer 2 technologies. Other fan-out and aggregation operations may take place at other OSI model layers depending on the network overlay and/or segmentation technologies upon which the fan-out/aggregation is based. As illustrated by such fan-out and aggregation procedures, the translations performed by the service functions of a service chain may allow for the implementation of traffic engineering tasks at service functions of service function chains.

Figure 7:
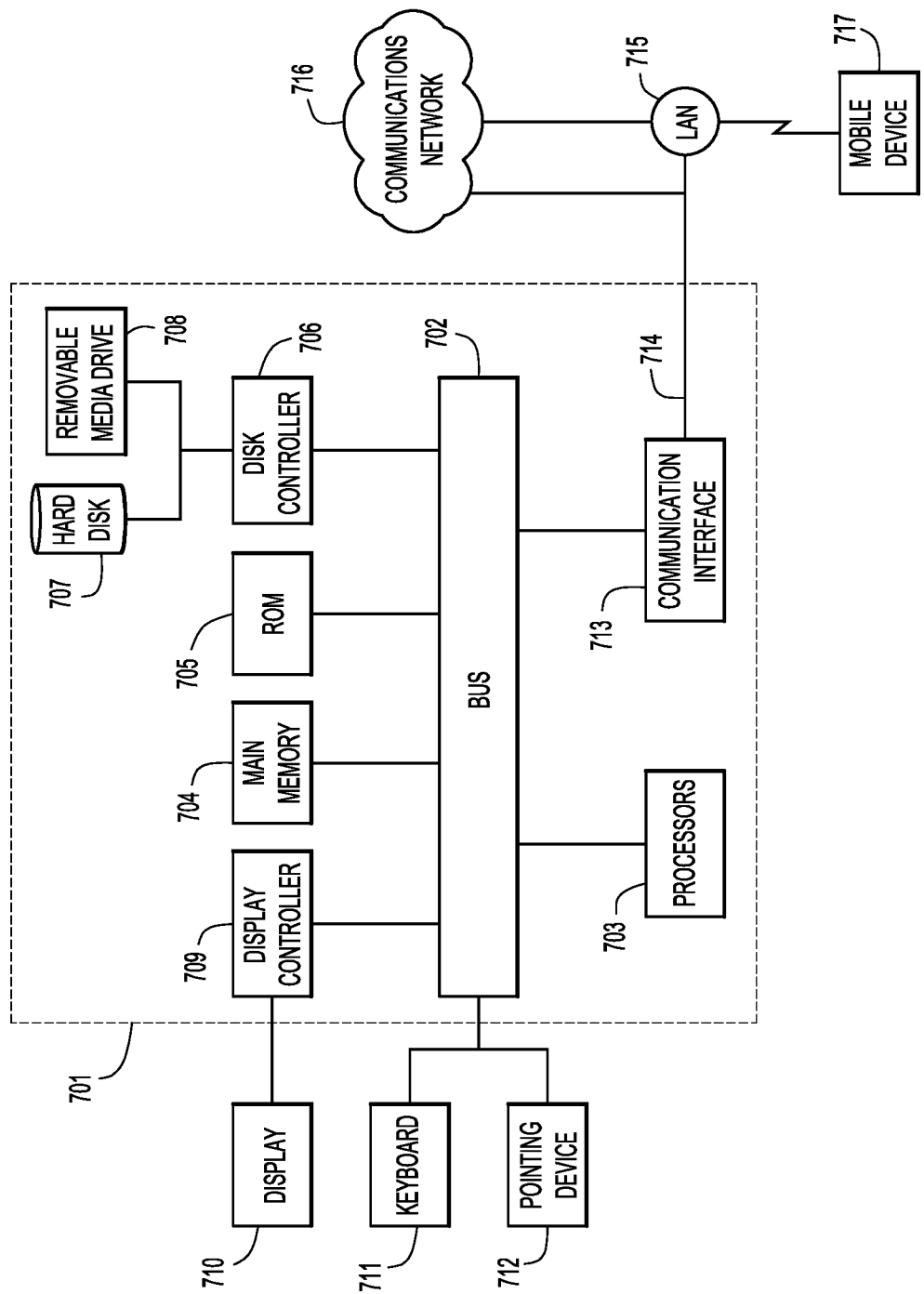
FIG. 7 is a block diagram of a device configured to provide network overlay and/or segmentation awareness in network service chains, according to an example embodiment.

With reference made to FIG. 7, illustrated therein is a computer system 701 upon which the embodiments presented may be implemented. The computer system 701 may be programmed to implement a computer based device, such as a device displaying a user interface, executing one or more physical or virtual service chain elements, such as the service chain elements of FIG. 1. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which may perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT) or a light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. The pointing device 712 may also be incorporated into the display device as, for example, a capacitive touchscreen and/or a resistive touchscreen. In addition, a printer may provide printed listings of data stored and/or generated by the computer system 701.

The computer system 701 performs a portion or all of the processing steps of the described herein in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer may read.

Stored on any one or on a combination of non-transitory computer readable storage media, embodiments presented herein include software for controlling the computer system 701, for driving a device or devices for implementing the processes described herein, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 may transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

In summary, the techniques described herein provide for the inclusion of network overlay and/or segmentation information in the metadata fields of an NSH of network service chain packets to enable network overlay and/or segmentation aware network functions and network overlay and/or segmentation aware service chains. The techniques described herein make use of the flexibility of the NSH metadata to employ intelligent data correlation utilizing network overlay and/or segmentation information for a wide range of use-cases and applications. Incorporating the network overlay and/or segmentation information is advantageous for data centers leveraging any type of overlay, such as VxLAN. The network overlay and/or segmentation information provides support for network services that are not aware of network overlay protocols and allow for the correlation of relevant information to network overlay details. These network overlay details may be used in correlation with many other information sets to granularly define policies. With VxLAN becoming more and more relevant in cloud-enabled data centers, the techniques described herein provide a way to run VxLAN tunnels end-to-end even across network services not aware of the VxLAN control plane.

Specifically, described herein are methods in which a packet is received at a device configured to provide a service function within a network service chain. A network overlay identifier and/or a segmentation identifier is extracted from a header of the packet. The service function is applied to the packet according to policies specific for a network overlay and/or segmentation identified by the network overlay identifier and/or segmentation identifier. Also provided for herein are devices that include a memory storing data indicating policies specific for a network overlay and/or segmentation, a network interface unit (e.g., network interface card). A processor is configured to provide a network service function within a network service chain. The processor is further configured to receive a packet via the network interface unit, extract a network overlay identifier and/or a segmentation identifier from a header of the packet, and apply the service function to the packet according to the policies specific for the network overlay and/or segmentation identified by the network overlay identifier and/or segmentation identifier.

Finally, also provided for herein are a non-transitory computer-readable storage media encoded with software comprising computer executable instructions. When the software is executed it is operable to receive a packet at a device configured to provide a service function within a network service chain, extract a network overlay identifier and/or a segmentation identifier from a header of the packet, and apply the service function to the packet according to policies specific for a network overlay and/or segmentation identified by the network overlay identifier and/or segmentation identifier.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, at a device configured to provide a network service via a service function within a network service chain, a packet encapsulated by a network service header, wherein the network service header is configured to route the packet through the network service chain;
   extracting, via the service function, a Universal Cloud Classifier from a metadata field of the network service header, wherein the Universal Cloud Classifier identifies a network overlay protocol or segmentation protocol applied to the packet encapsulated by the network service header, and wherein the Universal Cloud Classifier comprises a hierarchical identifier that identifies a cloud, a service and a tenant associated with a particular packet;
   determining, via the service function from the Universal Cloud Classifier, the network overlay protocol or segmentation protocol applied to the packet encapsulated by the network service header; and
   applying the network service to the packet according to policies specific for the network overlay protocol or segmentation protocol determined from the Universal Cloud Classifier by encapsulating the packet according to a network overlay protocol or a segmentation protocol that differs from the network overlay protocol or the segmentation protocol determined from the Universal Cloud Classifier.

2. The method of claim 1, further comprising extracting metadata stored in the network service header of the packet that is different than the Universal Cloud Classifier,
   wherein applying the network service to the packet comprises applying policies specific to the network overlay protocol or segmentation protocol and the metadata.

3. The method of claim 1, wherein the Universal Cloud Classifier identifies a specific instance of a network overlay environment or segmentation environment.

4. The method of claim 1, wherein the network overlay protocol determined from the Universal Cloud Classifier comprises one or more of Virtual Extensible Local Area Networks (VxLANs), Generic Routing Encapsulation (GRE) or Virtual Private Network (VPN) Tunnels.

5. The method of claim 1, wherein network overlay protocol or segmentation protocol determined from the Universal Cloud Classifier is applied to the packet such that a payload of the packet is encrypted, and wherein applying the network service to the packet comprises decrypting the packet.

6. The method of claim 1, wherein applying the network service to the packet comprises encapsulating the packet accordingly to one or more of a Virtual Extensible Local Area Networks (VxLANs) protocol, Generic Routing Encapsulation (GRE) protocol or Virtual Private Network (VPN) Tunnels protocol.

7. The method of claim 1, wherein the service function comprises a final service function in the network service chain.

8. An apparatus comprising:
a memory storing data indicating policies specific for a network overlay protocol or segmentation protocol;
a network interface unit configured to enable network connectivity; and
a processor, wherein the processor is configured to:
provide a network service via a service function within a network service chain;
receive, via the network interface unit, a packet encapsulated by a network service header, wherein the network service header is configured to route the packet through the network service chain;
extract, via the service function, a Universal Cloud Classifier from a metadata field of the network service header, wherein the Universal Cloud Classifier identifies the network overlay protocol or segmentation protocol applied to the packet encapsulated by the network service header, and wherein the Universal Cloud Classifier comprises a hierarchical identifier that identifies a cloud, a service and a tenant associated with a particular packet;
determine, via the Universal Cloud Classifier, the network overlay protocol or segmentation protocol applied to the packet encapsulated by the network service header; and
apply the network service to the packet according to the policies specific for the network overlay protocol or segmentation protocol determined from the Universal Cloud Classifier by encapsulating the packet according to a network overlay protocol or a segmentation protocol that differs from the network overlay protocol or the segmentation protocol determined from the Universal Cloud Classifier.

9. The apparatus of claim 8, wherein the processor is configured to:
extract metadata stored in the network service header of the packet that is different than the Universal Cloud Classifier; and
apply the network service to the packet based on policies specific to the network overlay protocol or segmentation protocol and the metadata.

10. The apparatus of claim 8, wherein the Universal Cloud Classifier identifies a specific instance of a network overlay environment or segmentation environment.

11. The apparatus of claim 8, wherein the network overlay protocol determined from the Universal Cloud Classifier comprises one or more of Virtual Extensible Local Area Networks (VxLANs), Generic Routing Encapsulation (GRE) or Virtual Private Network (VPN) Tunnels.

12. The apparatus of claim 8, wherein network overlay protocol or segmentation protocol determined from the Universal Cloud is applied to the packet such that a payload of the packet is encrypted, and wherein the processor is configured to apply the network service to the packet by decrypting the packet.

13. The apparatus of claim 8, wherein the processor is configured to apply the network service to the packet by encapsulating the packet accordingly to one or more of a Virtual Extensible Local Area Networks (VxLANs) protocol, Generic Routing Encapsulation (GRE) protocol or Virtual Private Network (VPN) Tunnels protocol.

14. The apparatus of claim 8, wherein the service function comprises a final service function in the network service chain.

15. A non-transitory computer-readable storage media encoded with software comprising computer executable instructions and when the software is executed operable to:
receive, at a device configured to provide a network service via a service function within a network service chain, a packet encapsulated by a network service header, wherein the network service header is configured to route the packet through the network service chain;
extract, via the service function, a Universal Cloud Classifier from a metadata field of the network service header, wherein the Universal Cloud Classifier identifies a network overlay protocol or segmentation protocol applied to the packet encapsulated by the network service header;
determine, via the service function from the Universal Cloud Classifier, the network overlay protocol or segmentation protocol applied to the packet encapsulated by the network service header; and
apply the network service to the packet according to policies specific for the network overlay protocol or segmentation protocol determined from the Universal Cloud Classifier by encapsulating the packet according to a network overlay protocol or a segmentation protocol that differs from the network overlay protocol or the segmentation protocol determined from the Universal Cloud Classifier.

16. The computer-readable storage media of claim 15, further comprising instructions operable to extract metadata stored in the network service header of the packet that is different than the Universal Cloud Classifier,
wherein the instructions operable to apply the network service to the packet comprise instructions operable to apply policies specific to the network overlay protocol or segmentation protocol and the metadata.

17. The computer-readable storage media of claim 15, wherein the Universal Cloud Classifier identifies a specific instance of a network overlay environment or segmentation environment.

18. The computer-readable storage media of claim 15, wherein the network overlay protocol determined from the Universal Cloud Classifier comprises one or more of Virtual Extensible Local Area Networks (VxLANs), Generic Routing Encapsulation (GRE) or Virtual Private Network (VPN) Tunnels.

19. The computer-readable storage media of claim 15, wherein the network overlay protocol or segmentation protocol determined from the Universal Cloud Classifier is applied to the packet such that a payload of the packet is encrypted, and wherein the instructions operable to apply the network service to the packet comprise instructions operable to decrypt the packet.

20. The computer-readable storage media of claim 15, wherein the instruction operable to apply the network service to the packet are operable to encapsulate the packet accordingly to one or more of a Virtual Extensible Local Area Networks (VxLANs) protocol, Generic Routing Encapsulation (GRE) protocol or Virtual Private Network (VPN) Tunnels protocol.

* * * * *